(12) United States Patent
Klonig et al.

(10) Patent No.: US 11,697,279 B2
(45) Date of Patent: Jul. 11, 2023

(54) METHOD AND DEVICE FOR PRODUCING A TEST ELEMENT

(71) Applicant: Roche Diagnostics Operations, Inc., Indianapolis, IN (US)

(72) Inventors: Kurt Klonig, Mannheim (DE); Marc Moldt, Mannheim (DE); Christine Nortmeyer, Mannheim (DE)

(73) Assignee: ROCHE DIAGNOSTICS OPERATIONS, INC., Indianapolis, IN (US)

(*) Notice: Subject to any disclaimer, the term of this patent is extended or adjusted under 35 U.S.C. 154(b) by 796 days.

(21) Appl. No.: 14/962,519

(22) Filed: Dec. 8, 2015

(65) Prior Publication Data

US 2016/0089867 A1 Mar. 31, 2016

Related U.S. Application Data

(63) Continuation of application No. PCT/EP2014/061983, filed on Jun. 10, 2014.

(30) Foreign Application Priority Data

Jun. 10, 2013 (EP) .................................. 13171207

(51) Int. Cl.
*B32B 37/12* (2006.01)
*G01N 27/327* (2006.01)
(Continued)

(52) U.S. Cl.
CPC .......... *B32B 37/12* (2013.01); *B32B 38/0008* (2013.01); *G01N 21/6428* (2013.01); *G01N 27/3272* (2013.01)

(58) Field of Classification Search
USPC ...................................................... 156/275.7
See application file for complete search history.

(56) References Cited

U.S. PATENT DOCUMENTS 6,623,664 B2 * 9/2003 Takaki ............... A61B 5/04087
156/327
2002/0156190 A1 * 10/2002 Sasaki .................... C08G 59/36
525/107
(Continued)

FOREIGN PATENT DOCUMENTS

EP 0297389 A1 3/1993
EP 0878708 A1 11/1998
(Continued)

OTHER PUBLICATIONS

International Search Report dated Jul. 9, 2014 in Application No. PCT/EP2014/061983, 4 pages.
(Continued)

*Primary Examiner* — Daniel McNally
(74) *Attorney, Agent, or Firm* — Woodard, Emhardt, Henry, Reeves & Wagner, LLP

(57) ABSTRACT

A method and a production device for producing a test element are disclosed. The method comprises providing in a transport step a continuous substrate tape, wherein the tape is transported in a transport direction parallel to a direction of extension of the continuous substrate tape; applying in an adhesive application step at least one continuous adhesive strip, wherein the strip is applied to the continuous substrate tape with a liquid adhesive and a slot coating process, and wherein the continuous adhesive strip is oriented parallel to the transport direction; applying in a cover element application step at least one cover element, wherein the at least one cover element is applied to the continuous adhesive strip, thereby securing the cover element to the continuous substrate tape; and individualizing in an individualization step the continuous substrate tape, wherein the tape is individualized into single test elements.

16 Claims, 3 Drawing Sheets

(51) Int. Cl.
  *B32B 38/00* (2006.01)
  *G01N 21/64* (2006.01)

(56) References Cited

U.S. PATENT DOCUMENTS

| | | | |
|---|---|---|---|
| 2004/0127594 A1* | 7/2004 | Yang | C08F 290/061 |
| | | | 522/114 |
| 2004/0214345 A1* | 10/2004 | Matzinger | G01N 33/525 |
| | | | 436/514 |
| 2004/0251132 A1 | 12/2004 | Leach et al. | |
| 2005/0008537 A1 | 1/2005 | Mosoiu et al. | |
| 2005/0016844 A1* | 1/2005 | Burke | G01N 33/558 |
| | | | 204/403.01 |
| 2008/0164142 A1 | 7/2008 | Alvarez-Icaza et al. | |
| 2009/0263652 A1 | 10/2009 | Brauner | |
| 2010/0166654 A1* | 7/2010 | Safavy | A61K 49/0056 |
| | | | 424/1.69 |
| 2012/0263879 A1 | 10/2012 | Wilsey et al. | |

FOREIGN PATENT DOCUMENTS

| | | |
|---|---|---|
| EP | 1291650 A1 | 3/2003 |
| EP | 1612554 A1 | 1/2006 |
| EP | 2110423 A1 | 10/2009 |
| EP | 2144061 A1 | 1/2010 |
| EP | 2306198 A1 | 4/2011 |
| EP | 2365329 A1 | 9/2011 |
| JP | 2007-276467 A | 10/2007 |
| JP | 2008-304486 A | 12/2008 |
| WO | 1987/002267 A1 | 4/1987 |
| WO | 2004/113917 A2 | 12/2004 |
| WO | 2006/100064 A1 | 9/2006 |
| WO | 2011/035861 A1 | 3/2011 |
| WO | 2012/017605 A1 | 2/2012 |

OTHER PUBLICATIONS

Hoenes, Joachim et al., The Technology Behind Glucose Meters: Test Strips, Diabetes Technology & Therapeutics, 2008, pp. S10-S26, vol. 10, Supplement 1.

* cited by examiner

METHOD AND DEVICE FOR PRODUCING A TEST ELEMENT

CROSS-REFERENCE TO RELATED APPLICATIONS

This application is a continuation of International Patent Application No. PCT/EP2014/061983, filed 10 Jun. 2014, which claims the benefit of European Patent Application No. 13171207.7, filed 10 Jun. 2013, the disclosures of which are hereby incorporated by reference in their entirety.

TECHNICAL FIELD

The present disclosure relates generally to the field of medical technology and diagnostics and, in particular, to a method and a device for producing a test element, more particularly a test element configured for detecting at least one analyte in a body fluid.

BACKGROUND

In the field of medical technology and diagnostics, a large number of devices and methods for determining the presence and/or the concentration of one or more analytes in body fluids are known. Without restricting the scope of the present disclosure, in the following, mainly reference is made to the determination of blood glucose concentrations.

For performing fast and simple measurements, several types of test elements are known, which mainly are based on the use of one or more test chemicals, i.e., on the use of one or more chemical substances, one or more chemical compounds or one or more chemical mixtures, adapted for performing a detection reaction for detecting the analyte. The test chemical often is also referred to as a test substance, a test reagent, a test chemistry or as a detector substance. For details of potential test chemicals and test elements comprising such test chemicals, which may also be used within the present disclosure, reference may be made to J. Hoenes et al.: The Technology Behind Glucose Meters: Test Strips, Diabetes Technology & Therapeutics, Vol. 10, Supplement 1, 2008, S-10 to S-26. Other types of test elements and/or test substances are feasible and may be used within the present disclosure.

By using one or more test chemicals, a detection reaction may be initiated, the course of which depends on the presence and/or the concentration of the at least one analyte to be determined. The detection reaction typically may be analyte-specific. Typically, as may also be the case in the present disclosure, the test chemical is adapted to perform at least one detection reaction when the analyte is present in the body fluid, wherein the extent and/or the degree of the detection reaction typically depends on the concentration of the analyte. Generally, the test chemical may be adapted to perform a detection reaction in the presence of the analyte, wherein at least one detectable property of at least one of the body fluid and the test chemical is changed due to the detection reaction. The at least one detectable property generally may be selected from a physical property and a chemical property.

In the following, without restricting potential other embodiments, reference will mainly be made to detection reactions in which one or more physical properties are changed due to the detection reaction, such as one or more of at least one electrical property and at least one optical property. Further, without restricting alternative solutions, reference will be made to detection reactions in which at least one optically detectable property of at least one of the body fluid and the test chemical is changed due to the detection reaction. This at least one optically detectable property generally may be detected by detecting light propagating from the test chemical to a detector. This light, which may also be referred to as the detection light, generally may be light emitted by the test chemical itself and/or light that is elastically and/or inelastically scattered or reflected by the test chemical. Thus, the light may be luminescence light, typically fluorescence light, the generation of which may be excited by excitation light illuminating the test chemical. Additionally or alternatively, the light may be light that is reflected by the test chemical, such as by reflecting and/or scattering primary light. In the latter case, the test chemical typically may be adapted to change at least one reflective property due to the detection reaction, typically a color.

For deriving the concentration of the analyte, the progress of the detection reaction may be monitored, such as by measuring and/or monitoring a time development of at least one measurement value indicating the progress of the detection reaction. This measurement value generally may comprise an arbitrary measurement value that is linked to the detection reaction, such as an optical measurement value. As an example, in many measurement setups, optical measurement values are monitored, such as a remission of a test field containing the test substance. Additionally or alternatively, electrical measurement values may be recorded. By recording the time development of at least one measurement value, a measurement curve is provided, from which a concentration of the at least one analyte in the body fluid may be derived. Additionally or alternatively, a measurement value at a predetermined point in time may be used for deriving the concentration of the analyte in the body fluid. As outlined above, in addition or as an alternative to providing an information on a concentration of the analyte, an information on the presence and/or absence of the analyte may be provided.

A major challenge resides in the production of test elements. Typically, test strips or test tapes are used for detecting the analyte. Still, specifically in many home care applications, the user will have to perform a plurality of measurements per week or even per day, so, specifically in the field of home monitoring and Point of Care products for the professional market, pricing of the test elements is an issue. Therefore, a constant need for cost-efficient and, still, reliable manufacturing methods exists.

In order to manufacture test elements on a large scale, typically, lamination techniques are used. Test strips typically are manufactured on a large scale from a continuous or endless tape, wherein, typically, adhesive laminate foils are applied to an endless carrier tape, in order to provide an adhesive layer in the laminate setup. Further, hot-melt applications may be used in order to apply single membranes or meshes to the test elements. Further, capillary-forming elements may be applied to the test elements, by using large-area gluing processes. In these gluing processes, base and cover elements of the capillary elements and/or wall elements, such as spacers in between the base and cover element, may be glued together. Further, additionally or alternatively, various layers of a layer setup may be joined by a gluing process.

Despite the advantages involved in the methods and devices known in the art, a large number of disadvantages and technical challenges remain. These challenges widely are linked to the fact that a fine-patterning of structures and functional elements on the test elements has to be combined with a high-throughput manufacturing process. Thus, as an example, a precise positioning of test fields, capillary elements, cover elements, electrodes or membranes has to be integrated into a high-speed manufacturing process. Specifically, when applying one or more cover elements to a substrate by using an adhesive, a precise and, still, cost-efficient method for applying the adhesive to the substrate is an issue, specifically in case small-scale adhesive patterns or adhesive strips are required, which is the case specifically in miniaturized test strips. Further, most known techniques, such as the above-mentioned lamination techniques, imply a manufacturing of one or more intermediate products, such as one or more intermediate tapes, having a liner covering the adhesive tape, wherein the intermediate products have to be spooled onto an intermediate product reel. Before continuing the manufacturing process, the liner has to be removed from the intermediate product, which involves an additional manufacturing step and, thus, renders the manufacturing process complicated and costly.

SUMMARY

It is against the above background that the embodiments of the present disclosure provide certain unobvious advantages and advancements over the prior art. In particular, the inventors have recognized a need for improvements in methods and devices for manufacturing test elements.

Although the embodiments of the present disclosure are not limited to specific advantages or functionality, it is noted that the present disclosure provides methods and devices for manufacturing test elements involving one or more adhesives, which both are cost-efficient and suited for a large-scale manufacturing and, still, provide a sufficient level of precision even for miniaturized test strips having fine-patterned functional elements.

The present disclosure relates generally to a method and a device for producing a test element, more particularly a test element configured for detecting at least one analyte in a body fluid. Further, the disclosure relates to a test element producible by the method according to the disclosure and a use of a slot coating process, typically a slot die coating process, for applying at least one adhesive strip to a test element for detecting at least one analyte in a body fluid. The method, the devices and the use according to the present disclosure typically may be applied in the field of detecting one or more analytes such as glucose, lactate, triglycerides, cholesterol or other analytes, typically metabolites, in body fluids such as blood, typically whole blood, plasma, serum, urine, saliva, interstitial fluid or other body fluids, both in the field of professional diagnostics and in the field of home monitoring. However, other fields of application are feasible.

In accordance with one embodiment of the disclosure, a method for producing a test element for detecting at least one analyte in a body fluid is provided, the test element having at least one test chemical configured to perform at least one detection reaction in the presence of the analyte, the method comprising the following steps: a) providing, in a transport step, a continuous substrate tape, wherein the continuous substrate tape is transported in a transport direction parallel to a direction of extension of the continuous substrate tape; b) applying, in an adhesive application step, at least one continuous adhesive strip to the continuous substrate tape by using a liquid adhesive and a slot coating process, the continuous adhesive strip being oriented parallel to the transport direction, wherein the liquid adhesive is provided in a liquid form, and wherein the liquid adhesive comprises one or more solvents; c) applying, in a cover element application step, at least one cover element to the continuous adhesive strip, thereby securing the cover element to the continuous substrate tape; and d) individualizing, in an individualization step, the continuous substrate tape into single test elements, wherein the method further comprises at least one drying step, and wherein the continuous adhesive strip is at least partially dried in the drying step.

In accordance with another embodiment, a production device for producing a test element for detecting at least one analyte in a body fluid is provided, the test element having at least one test chemical configured to perform at least one detection reaction in the presence of the analyte, the production device comprising: a tape transport device, wherein the tape transport device is configured to provide a continuous substrate tape, and wherein the tape transport device is configured to transport the continuous substrate tape in a transport direction parallel to a direction of extension of the continuous substrate tape; an adhesive application device, wherein the adhesive application device is configured to apply at least one continuous adhesive strip to the continuous substrate tape, by using a liquid adhesive and a slot coating process, the continuous adhesive strip being oriented parallel to the transport direction wherein the liquid adhesive is provided in a liquid form, wherein the liquid adhesive comprises one or more solvents; a cover element application device, wherein the cover element application device is configured to apply at least one cover element to the continuous adhesive strip, thereby securing the cover element to the continuous substrate tape; an individualization device, wherein the individualization device is configured to individualize the continuous substrate tape into single test elements; and at least one drying device, the drying device being configured to at least partially dry the continuous adhesive strip.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
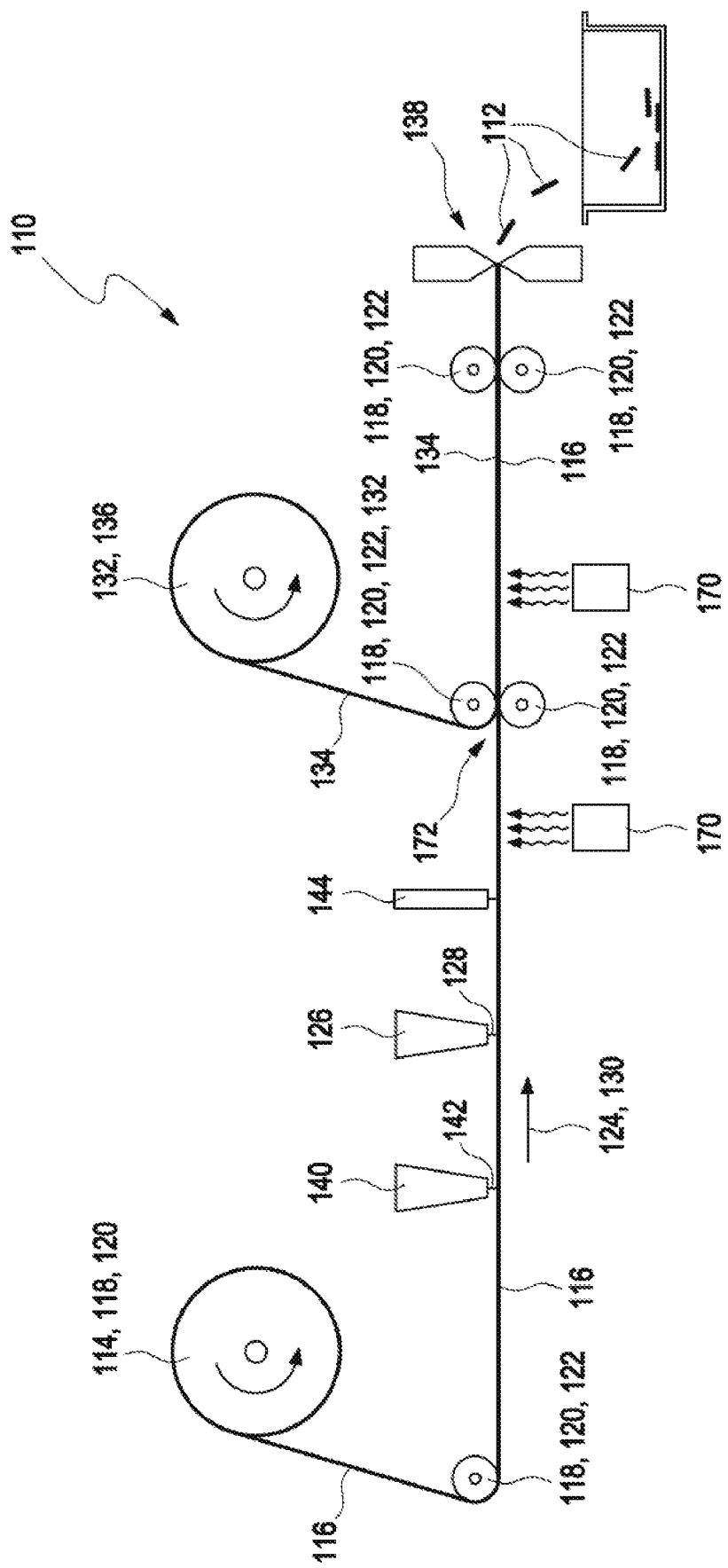
FIG. 1 shows an exemplary embodiment of a production device for producing a test element for detecting at least one analyte in a body fluid, in a side view.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements or components are present in entity A, such as element C, elements C and D or even further elements or components.

In accordance with an embodiment of the present disclosure, a method for producing a test element for detecting at least one analyte in a body fluid is disclosed. Generally, as used herein, a test element is an arbitrary element that is adapted for detecting one or more analytes in a body fluid, wherein a quantitative and/or a qualitative detection may be performed. The test element may typically be selected from the group consisting of an optical test element, which is adapted for detecting the analyte by using at least one optical detection method, and an electrochemical test element, which is adapted for detecting the analyte by using at least one electrochemical measurement, such as the measurement of at least one voltage and/or at least one current. For potential setups of the test element, reference may be made to the Background section above and otherwise will be known to those of ordinary skill in the art. Further, combined test elements providing electrochemical tests and/or optical tests may be feasible. Additionally or alternatively, other types of test elements may be used. The test element as discussed in the following disclosure typically is a test strip, i.e., a strip-shaped test element, such as a test element having a strip length of 5 mm to 100 mm, typically 10 mm to 50 mm, and a strip width of typically 1 mm to 30 mm, typically 3 mm to 10 mm. The thickness of the test strips typically is below 2 mm, typically below 500 µm, and the test strips typically are flexible, i.e., are deformable by hand.

The test element has at least one test chemical adapted to perform at least one detection reaction in the presence of the analyte. For a definition of the test chemical, for potential embodiments of the test chemical and for potential embodiments of the detection reaction, which, e.g., may be an optical detection reaction and/or an electrochemical detection reaction, reference may be made to the Background section above and otherwise will be known to those of ordinary skill in the art. Typically, the test chemical is a dry test chemical. For potential compositions of the test chemical, reference may be made to the Background section above and otherwise will be known to those of ordinary skill in the art.

The method comprises the following method steps, which may be performed in the given order. However, other orders of the method steps are feasible. Further, two or more of the method steps may be performed simultaneously and/or overlapping in time. Thus, typically, the method provides a continuous manufacturing process, in which at least method steps a) and b), optionally additionally method steps c) and/or d), may be performed simultaneously, such as in an in-line-process. Further, one or more of the method steps may be performed repeatedly or iteratively. Further, one or more additional method steps may be provided, which are not listed in the following.

The method comprises the following steps:
a) a transport step, wherein a continuous substrate tape is provided, the continuous substrate tape being transported in a transport direction parallel to a direction of extension of the continuous substrate tape;
b) an adhesive application step, wherein at least one continuous adhesive strip is applied to the continuous substrate tape, by using a liquid adhesive and a slot coating process, the continuous adhesive strip being oriented parallel to the transport direction;
c) a cover element application step, wherein at least one cover element is applied to the continuous adhesive strip, thereby securing the cover element to the continuous substrate tape; and
d) an individualization step, wherein the continuous substrate tape is individualized into single test elements.

As outlined above, the transport step and the adhesive application step typically are performed simultaneously and continuously. Thus, the transport step and the adhesive application step each may be a continuous process.

As outlined above, in the transport step, a continuous substrate tape is provided. As used herein, the term "continuous substrate tape" refers to the fact that the continuous substrate tape provides a substrate for more than one test element, typically for at least 10, at least 100, at least 1,000 or even at least 10,000 or at least 100,000 test elements. Thus, typically, the continuous substrate tape has a length, i.e., an extension along a direction of extension of the substrate tape, of typically at least 1 m, more typically at least 10 m, and most typically at least 30 m. The continuous substrate tape may have a width perpendicular to the direction of extension of the substrate tape which, typically, is at least 5 mm, more typically at least 10 mm, such as 20 mm or more. This width may correspond to the length of the test elements, since, as will be outlined in further detail below, the individualization step d) typically implies a cutting of the continuous substrate tape in a direction perpendicular to the extension of the substrate tape. Thus, with regard to typical embodiments of the width of the continuous substrate tape, reference may be made to the typical length of the test strips as given above.

The transportation of the continuous substrate tape, as an example, may be performed by using one or more reels and/or one or more other types of transportation devices, such as rollers and/or transport wheels. The continuous substrate tape, as will be outlined in further detail below, may be provided by using at least one supply reel.

As outlined above, the transport direction is parallel to a direction of extension of the substrate tape. Thus, the continuous substrate tape may be spooled along a direction of extension, such that all sections of the continuous substrate tape successively or continuously may pass one or more application stations of a device for performing the method, as will be outlined in further detail below. Thus, the direction of lateral extension of the substrate tape and the transport direction may be the direction of the transport at the location of one or more application stations of the device, such as at the location of an adhesive application device and/or a cover element application device, as will be outlined in further detail below.

As outlined above, in method step b), a liquid adhesive is applied. As used herein, the term "liquid" refers to the fact that the liquid adhesive is provided in an amorphous, deformable format, such as in a liquid form and/or as a paste. Typically, the liquid adhesive is provided in a liquid form, such as in the form of a solution, an emulsion and/or a dispersion. Thus, the liquid adhesive typically may comprise one or more solvents.

As used herein, the term "slot coating process," which typically implies a slot die coating process, generally refers to a process of applying a liquid or a paste to a substrate by using one or more slots, such as by using one or more dies, each die having one or more slots (slot die). Thus, as an example, the slot coating process, such as the slot die coating process, may provide a slot perpendicular to the transport direction, wherein the transport direction typically in this location is a horizontal direction. The liquid adhesive may pass the slot due to an external pressure and/or due to its own weight and may hit a surface of the substrate tape. Typically, in this location, the substrate tape is in motion and immediately takes away the liquid adhesive applied to the surface, thereby continuously applying additional liquid adhesive in a continuous film onto the surface.

The slot typically may be part of a nozzle, typically a die. Thus, the nozzle or die may comprise one or more shims having the shape of a slot, typically a rectangular slot, with a longer side of the rectangle typically being oriented perpendicular to the transport direction. Slot coating processes are generally known for other applications in the art, such as from International Patent Application Publication No. WO 2004/113917 A2, the disclosure of which is hereby incorporated by reference for its teaching of slot coating processes, generally.

As used herein, the term "continuous adhesive strip" generally refers to a strip-shaped element having precise boundaries parallel to the transport direction and, thus, typically parallel to the long sides of the continuous substrate tape.

As used herein, the term "cover element" generally refers to an arbitrary element that is glued to the substrate tape by using the at least one continuous adhesive strip. The cover element typically may be a continuous cover element, which, in the individualization step and/or in an additional cover element singularization step, may be separated or individualized into individual cover elements for each test element. Examples of cover elements that may be used in accordance with various embodiments of the present disclosure will be given in further detail below.

As further used herein, the term "individualize" generally refers to the process of separating the continuous substrate tape, with one or more additional elements disposed thereon (such as the liquid adhesive and/or the cover element) into a plurality of test elements or pre-products of the test elements. Thus, in step d), ready-to-use test elements may be generated and/or intermediate products of the test elements, which may optionally be subject to one or more subsequent finalization steps.

As outlined above, the method according to an embodiment of the present disclosure may comprise one or more additional steps. Thus, the method may further comprise the step of applying the test chemical to at least one of the continuous substrate tape and the cover element. This method step may be performed during the transportation step, such as before or after the adhesive application step or even parallel to the adhesive application step. With regard to potential test chemicals or application methods for test chemicals, reference may be made to the Background section above. As an example, the method as disclosed in International Patent Application Publication No. WO 2004/113917 A2 may be used. Additionally or alternatively, knife-coating techniques and/or roller coating techniques and/or printing techniques may be used, typically in a continuous process. Thus, generally, the application of the at least one test chemical typically is performed in a continuous process.

The continuous adhesive strip typically may have a width perpendicular to the transport direction of less than 5 mm, typically less than 4 mm and, more typically, of less than 3 mm. The continuous adhesive strip, as an example, may have a width perpendicular to the transport direction of at least 1 mm and less than 5 mm. Other dimensions are possible.

Generally, different dimensions of the continuous adhesive strip are feasible. Thus, as an example, the continuous adhesive strip may have a width perpendicular to the transport direction of 0.5 mm to 40.0 mm, typically of 1.0 mm to 5 mm, more typically a width of 1.0 mm to 3.0 mm and, most typically, 2.0 mm. Other dimensions are feasible.

As outlined above, one or more continuous adhesive strips may be applied to the continuous substrate. Thus, according to one embodiment of the present disclosure, as will be outlined in further detail below, two or more continuous adhesive strips may be applied to the continuous substrate, even with a high precision, such as two or more continuous adhesive strips having the dimensions as given above, such as a width of 1.0 mm to 5.0 mm, typically a width of less than 5.0 mm. Other dimensions are feasible.

As outlined above, the slot coating process typically comprises a slot die coating process. Typically, the slot coating process is adapted to apply a pressure of more than 1 bar to the liquid adhesive, such as a pressure of 1 to 2 bar. The liquid adhesive typically may be supplied to a die of a die slot coater or slot die coating device via at least one tubing system and/or at least one pump.

In case a slot die is used in the slot coating process, typically, the slot die has a width perpendicular to the transport direction of less than 5 mm, typically a width of less than 4 mm and, more typically, a width of less than 3 mm. For potential dimensions of the slot, reference may be made to the typical width of the continuous adhesive strip as outlined above. Thus, the width of the slot die typically corresponds to the width of the continuous adhesive strip. Typically, the width of the slot die is at least 1 mm, such as 1 to 3 mm, typically 2 mm.

As outlined above, typically, the continuous substrate may be a flexible tape or foil. As an example, the continuous substrate tape may comprise one or more of: a plastic tape, such as a polyester tape; a membrane; a metal foil; a non-woven fabric, typically a non-woven fabric containing glass fibers; a paper material; a textile; a micro-structured material. Additionally or alternatively, other materials and/or combinations of materials may be used. Additionally or alternatively, the continuous substrate tape may comprise a laminate tape, comprising one or more plastic materials and/or one or more additional materials. The flexible tape may be a transparent or intransparent tape. The continuous substrate tape typically may have a thickness of 10 µm to 1 mm, more typically a thickness of 20 µm to 50 µm and, most typically, a thickness of 30 µm. Other dimensions are feasible.

The continuous substrate tape typically may be provided by using at least one supply reel. As outlined above, additional transport elements may be provided, such as one or more transport wheels and/or one or more transport rollers.

Further embodiments refer to the cover element. Thus, as outlined above, the cover element generally may be or may comprise one or more elements that are secured directly or indirectly to the transport tape via the at least one adhesive strip. The cover element may be a passive cover element that simply provides a protection of the test element or parts thereof against detrimental influences, such as mechanical influences and/or environmental influences. Additionally or alternatively, however, the at least one cover element may be or may comprise at least one functional element. As used herein, the term "functional element" generally refers to an element providing one or more functions to the test element that are related to the detection of the analyte in the body fluid. Thus, the functional element may be or may comprise a fluidic functional element, such as a fluidic transport element, more typically at least one capillary element. As used herein, the term "capillary element" generally refers to an element that forms at least a part of a sidewall of a capillary channel for transporting liquids by capillary forces. Additionally or alternatively, the at least one functional element may be or may comprise at least one separation element, such as at least one separating membrane, such as for separating one or more components of the body fluid. Additionally or alternatively, the at least one functional element may comprise one or more spreading elements adapted for spreading the body fluid or at least one part thereof over a specific region or area. Thus, as an example, the functional element may be or may comprise at least one cover foil that is adapted to spread the body fluid or a part thereof over one or more electrodes and/or over one or more test fields, typically by capillary forces and/or surface action. Again, additionally or alternatively, as outlined above, the cover element may comprise one or more substrate elements and one or more test chemicals applied thereto. Thus, the at least one functional element may be or may comprise at least one test chemical, typically in the form of at least one test field. Thus, the test element generally may comprise one or more test fields comprising the at least one test chemical, wherein the test field may have a monolayer or a multilayer setup. The at least one test field may be applied directly or indirectly to the continuous substrate tape or the substrate of the test element made thereof, and/or may be applied directly or indirectly to the cover element.

Thus, summarizing, the cover element typically may comprise at least one element selected from the group consisting of: a spreading element; a capillary element; an electrode; a cover foil; a reagent foil or test field comprising the at least one test chemical; a membrane for separating at least two components of the sample of the body fluid. Additionally or alternatively, other types of elements may be provided, typically functional elements.

The cover element may be applied to the adhesive strip in an individualized form and/or in a continuous format. Thus, individual cover elements, such as one or more cover elements per test element, may be applied to the continuous adhesive strip, before individualization. Additionally or alternatively, the at least one cover element may be provided in a continuous process. Thus, typically, the at least one cover element is a continuous cover element or comprises a continuous cover element, the continuous cover element being continuous in the direction of the extension of the substrate tape and/or in the transport direction. Thus, as an example, the at least one cover element may comprise at least one continuous cover foil or continuous cover tape, such as at least one continuous plastic tape and/or at least one continuous laminate tape.

As outlined above, the method according to the present disclosure typically is performed in a continuous process. Thus, typically, method steps a) and b) and, optionally, steps c) and/or d), are performed continuously, such as in an in-line-process, more typically in a reel process. Thus, as an example, the at least one cover element may be provided by using at least one supply reel.

Further embodiments refer to the test chemical that may be used within the present disclosure. For potential embodiments of the test chemical, reference may be made to the Background section above. Other types of test chemicals may be used alternatively or additionally, which will be known to those in the art. Thus, as an example, the at least one test chemical may comprise at least one optical test chemical, wherein the at least one optical test chemical is adapted to perform at least one optical detection reaction in the presence of the analyte, wherein at least one optically detectable property of at least one of the optical test element and the body fluid changes due to the optical detection reaction. As an example, the at least one optically detectable property may be or may comprise a fluorescence property and/or a phosphorescence property and/or a luminescence property. Additionally or alternatively, the at least one optically detectable property may be or may comprise a reflection property of the test chemical, typically of a test field comprising the test chemical, such as at least one remission and/or at least one color. As an example, the at least one test chemical may comprise one or more enzymes, such as glucose oxidase and/or glucose dehydrogenase. Additionally or alternatively, other components may be comprised, such as one or more dyes and/or colorants. Further, one or more additional elements may be comprised, such as co-enzymes and/or mediators.

Additionally or alternatively to the use of at least one optical test chemical, the at least one test chemical may be or may comprise at least one electrochemical test chemical. The electrochemical test chemical may be adapted to perform at least one electrochemical detection reaction in the presence of the analyte. At least one electrically detectable property of at least one of the electrochemical test chemical and the body fluid may change due to the electrochemical detection reaction. Again, the at least one electrochemical test chemical may be or may comprise at least one enzyme, such as glucose dehydrogenase and/or glucose oxidase. Additionally or alternatively, other components may be present, such as one or more co-enzymes and/or one or more mediators. The at least one electrically detectable property may be at least one property that may be detected by using one or more electrodes, as is known in the art. Thus, the at least one electrically detectable property may be or may comprise a current and/or a voltage. Thus, the at least one test chemical may be applied to at least one working electrode of the test element, wherein at least one counter electrode and/or reference electrode may be provided. A current and/or a voltage between the working electrode and the at least one further electrode may be measured, in order to determine the at least one electrically detectable property. For further details, reference may be made to the related art listed above.

Thus, generally, the method and the production device according to the embodiments of the present disclosure typically may be used for manufacturing optical test elements, for manufacturing electrochemical test elements or for manufacturing hybrid test elements, providing both means for optical measurements and means for electrochemical measurements.

In case at least one electrochemical test chemical is used, the method according to an embodiment of the present disclosure may further comprise the method step of applying at least one electrode to at least one of the continuous substrate tape and the cover element. The electrochemical test chemical may be applied to the electrode. Thus, one or more electrodes may be provided directly or indirectly on the continuous substrate tape and/or on the cover element. The substrate tape and/or the cover element may be provided with the one or more electrodes already deposited thereon, such as by providing one or more intermediate products. Additionally or alternatively, the application of the one or more electrodes may fully or partially take place during the method according to an embodiment of the present disclosure.

As an example, the continuous substrate tape may comprise one or more conductive layers in a patterned fashion and/or in an unpatterned fashion. The one or more conductive layers, as an example, may comprise one or more metal layers such as metal layers comprising one or more metal materials selected from the group consisting of Ag, Al, Au, Pt, Pd, Ni and Cu, as pure materials and/or as a component of an alloy or Cermet. Additionally or alternatively, other metals may be used. In addition or alternatively, other types of conductive materials having electrically conductive properties may be used, such as one or more electrically conductive organic materials, typically electrically conductive polymers, and/or conductive coatings as will be known to the skilled person.

For applying the at least one electrode, known techniques may be used. Thus, the at least one electrode typically comprises one or more metal electrodes, such as one or more electrodes made of gold. For applying the metal, known techniques such as physical vapor deposition and/or chemical vapor deposition, typically sputtering techniques, may be used. Additionally or alternatively, other application techniques may be used, such as lamination techniques. For patterning the one or more electrodes, typical patterning techniques may be used. The patterning may take place during deposition of the one or more metals and/or may take place in a subsequent step. Thus, as an example, a patterning by using ablation techniques may be performed, such as one or more laser ablation techniques and/or etching techniques.

As outlined above, for applying the at least one electrochemical test chemical to the at least one electrode or to at least one of the electrodes, known deposition techniques may be used. Thus, knife-coating, printing, roller blading, dispensing, screen printing or other techniques may be applied.

As outlined above, typically, at least method steps b) and c) are performed in a continuous process. Thus, typically, the process implies an in-line-application. As an example, the full process may be an in-line-process, without generating an intermediate product, which might be spooled onto a reel. However, additionally or alternatively, one or more intermediate products may be generated during the process, and the process might be interrupted by intermediately storing the intermediate product. Typically, however, a continuous process is used, typically a reel process.

Further embodiments refer to the liquid adhesive. Typically, the liquid adhesive has a viscosity of 20 mPas to 10,000 mPas. As an example, the liquid adhesive may have a viscosity of more than 100 mPas, such as a viscosity of 100 mPas to 1,000 mPas. Other viscosities are feasible.

The continuous adhesive strip and/or the liquid adhesive may have various properties, such as electrical properties. Thus, the continuous adhesive strip may have electrical properties selected from the group of electrically insulating properties and electrically conductive properties. Thus, the at least one continuous adhesive strip and/or the at least one adhesive strip on the test element may be used for electrically connecting two or more conductive elements. As an example, when using one or more continuous adhesive strips having electrically conductive properties, the at least one adhesive strip formed thereby may be used in a layer setup for electrically connecting electrical leads or other electrical elements in different layers of the layer setup.

In order to provide electrically conductive properties, the liquid adhesive may comprise one or more electrically conductive components, such as metal particles and/or electrically conductive carbon particles. As an example, the liquid adhesive may comprise one or more matrix components and/or binders and, in addition, one or more filler materials having electrically conductive properties, such as metal particles and/or carbon particles. Other ways of rendering the liquid adhesive electrically conductive are known to the skilled person and may be used in addition.

Additionally or alternatively, at least one liquid adhesive and/or at least one continuous adhesive strip may be used having electrically insulating properties. These elements may, as an example, be used in case no electrical connection has to be provided via the continuous adhesive strip or the adhesive strip formed thereby, or in case an electrical insulation has to be provided by the continuous adhesive strip on the adhesive strip formed thereby, such as an electrical insulation between neighboring electrically conductive layers of a layer setup. The test element even may comprise a combination of one or more electrically conductive adhesive strips and one or more electrically insulating adhesive strips.

The continuous adhesive strip and/or the liquid adhesive may have various properties, such as thermal properties. Thus, the continuous adhesive strip may have thermal properties selected from the group of thermally insulating properties and thermally conductive properties. Thus, the at least one continuous adhesive strip and/or the at least one adhesive strip on the test element may be used for thermally connecting two or more adjacent elements. As an example, when using one or more continuous adhesive strips having thermally conductive properties, the at least one adhesive strip formed thereby may be used in a layer setup for thermally connecting elements in adjacent layers of the layer setup.

In order to provide thermally conductive properties, the liquid adhesive may comprise one or more thermally conductive components, such as metal particles. As an example, the liquid adhesive may comprise one or more matrix components and/or binders and, in addition, one or more filler materials having good thermally conductive properties, such as metal particles. Other ways of rendering the liquid adhesive thermally conductive are known to the skilled person and may be used in addition.

Additionally or alternatively, at least one liquid adhesive and/or at least one continuous adhesive strip may be used having thermally insulating properties. These elements may, as an example, be used in case no thermal connection or heat transfer has to be provided via the continuous adhesive strip or the adhesive strip formed thereby, or in case a thermal insulation has to be provided by the continuous adhesive strip on the adhesive strip formed thereby, such as a thermal insulation between neighboring layers of a layer setup. The test element even may comprise a combination of one or more thermally conductive adhesive strips and one or more thermally insulating adhesive strips.

The continuous adhesive strip, typically in an adhesive or wet state, may have a thickness, i.e., an extension perpendicular to a surface of the continuous substrate tape, of 2 µm to 150 µm, typically of 10 µm to 100 µm, more typically of 5 µm to 50 µm, and most typically of 10 µm to 20 µm, such as 15 µm. Other dimensions are feasible.

In a further embodiment, the method may further comprise one or more drying steps, wherein the continuous adhesive strip is fully or partially dried in the drying step. As used herein, the term "drying" generally refers to a full or partial solidification of the liquid adhesive in the liquid adhesive step, such as by fully or partially removing one or more solvents from the liquid adhesive and/or by initiating one or more chemical reactions within the liquid adhesive, such as crosslinking reactions. In the latter case, the at least one chemical reaction may be initiated by internal factors, such as one or more initiators contained within the liquid adhesive, and/or may be initiated by one or more external influences, such as heat and/or electromagnetic radiation, as will be outlined in further detail below.

The at least one drying step may be performed before or after the cover element application step. In case at least one drying step is provided before the cover element application step, typically, the at least one liquid adhesive is not fully cured or dried during the at least one drying step, such that a stickiness or adhesive properties of the continuous adhesive strip remain even after the drying step. Additionally or alternatively, the at least one drying step may be performed fully or partially after the at least one cover element application step, such as by heating and/or setting and/or curing via electromagnetic radiation. Thus, typically, a full or partial solidification of the at least one continuous adhesive strip takes place after the application of the at least one cover element, typically before performing the at least one individualization step.

As outlined above, the at least one drying step may optionally comprise exerting one or more influences to the continuous adhesive strip and/or the liquid adhesive. Thus, as an example, the drying step may comprise one or more of: a heating of the adhesive strip; an exposure of the adhesive strip to hot gas, such as hot air; an exposure of the adhesive strip to electromagnetic radiation, typically electromagnetic radiation in the ultraviolet spectral range. Additionally or alternatively, other types of heating processes may be performed, such as simple setting processes, such as by leading the continuous substrate tape with the continuous adhesive strip and the cover element disposed thereon via at least one setting distance, in order to provide sufficient time for full or partial setting of the adhesive. Additionally or alternatively, the drying step may imply a drying by using at least one heating channel and/or at least one heating plate. Thus, as an example, the continuous substrate tape with the continuous adhesive strip and the cover element disposed thereon may be led over at least one heating channel and/or over at least one heating plate. As an example, temperatures of 30° C. to 150° C. may be applied to the continuous adhesive strip, such as temperatures of 40° C. to 100° C. Other temperatures are feasible.

For further improving the adhesion of the at least one cover element to the at least one continuous substrate tape, pressure may be applied. Thus, as an example, the cover element may be pressed onto the continuous adhesive strip or vice versa. For continuously pressing the cover element to the continuous adhesive strip and/or the continuous substrate tape, various pressurizing techniques may be used. Thus, as an example, one or more pressurizing rollers may be used, such as one or more rollers pressing the cover element onto the continuous adhesive strip or vice versa, by using a rigid support, and/or one or more roller clearances or nibs through which the setup comprising the continuous substrate tape, the continuous adhesive strip and the cover element is led during a continuous process. Other options are feasible.

Further optional embodiments refer to the type of the liquid adhesive. Generally, the liquid adhesive may be or may comprise an arbitrary type of liquid adhesive, such as one or more crosslinkable monomers, oligomers or polymers and/or such as one or more polymers containing one or more solvents. As an example, epoxy resins may be used. As a further example, acrylic liquid adhesives may be used. Thus, as an example, the liquid adhesive may be or may comprise a contact adhesive and/or a bonding emulsion. Further, additionally or alternatively, the liquid adhesive may be or may comprise a dispersion, typically an aqueous dispersion. As an example, transfer adhesives may be used, which typically are used in the field of adhesive tapes, specifically double-sided adhesive tapes. The liquid adhesive may have a basic material, such as an acrylate. As an example, a dispersion of an acrylate may be used as a basic material of the liquid adhesive, as is the case for Ucecryl® adhesives (Cytec Surface Specialties SA/NV, Brussels, Belgium), such as the Ucecryl® adhesives described in U.S. Patent Application Publication No. 2009/0263652 A1. Additionally or alternatively, one or more of the following liquid adhesives on the basis of an acrylate dispersion may be used: a Helmitin® liquid adhesive, such as Helmitin® 35038; a Swift®tak adhesive, such as Swift®tak 2050; a Technicoll® adhesive, such as Technicoll® 9220 and/or Technicoll® 921; all available from Ruderer Klebetechnik GmbH, Zorneding, Germany.

The liquid adhesive, such as one or more of the above-mentioned liquid adhesives and, more specifically, a liquid adhesive based on an acrylate dispersion, may comprise one or more additives. Thus, as an example, specifically for liquid adhesives based on an acrylate dispersion, one or more adhesives may be added, selected from the group consisting of: an electrically conductive material, specifically a metal and/or graphite, more specifically one or more of gold, silver or graphite dispersed within the liquid adhesive; a thermally conductive material; one or more additives for adjusting rheological properties, such as more thickeners; an anti-foaming agent. Other additives are feasible.

Generally, the liquid adhesive may provide various properties, with regard to one or more of rheology, thermal conductivity and electrical conductivity. Thus, the liquid adhesive may be selected from the group consisting of: an electrically conductive liquid adhesive; an electrically insulating liquid adhesive; a thermally conductive liquid adhesive; and a thermally insulating liquid adhesive.

As outlined above, the term "liquid adhesive" generally refers to the adhesive in a non-dried or only partially dried state. Thus, in this state, one or more solvents may still be present and/or the liquid adhesive at least partially is in a non-cross-linked state. Contrarily, in the final test element, after individualization of the test elements, the test element may comprise one or more adhesive strips in which the adhesive is in a fully or partially dried state, such as in a state in which the at least one solvent is fully or partially removed and/or in a state in which the adhesive is fully or at least partially cross-linked.

As outlined above, the at least one liquid adhesive may comprise one or more solvents, in order to provide a solution, a dispersion or an emulsion. Therein, polar and/or non-polar solvents may be used. The content of the one or more solvents may further be used to adapt the viscosity of the liquid adhesive, in order to optimize the coating properties of the liquid adhesive during the slot coating process. As a most typical example, specifically for reasons of toxicity and/or compatibility with other ingredients, water-based liquid adhesives may be used, such as water-borne emulsions.

The liquid adhesive may further comprise one or more additional components that do not directly imply adhesive properties. Thus, as an example, the liquid adhesive may comprise at least one surface-active additive, typically at least one surfactant and, more typically, at least one hydrophilic surfactant. The at least one surface-active additive may be mixed into the liquid adhesive. Additionally or alternatively, the method may further comprise at least one step of applying at least one surfactant to a surface of the continuous adhesive strip, typically at least one alcoholic surfactant.

The slot coating process may further imply the use of a die, as outlined above. Thus, the die may comprise one or more shims. The slot coating process may imply the use of a die being separated from a surface of the continuous substrate tape by 10 µm to 1.0 mm, such as by 20 µm to 200 µm, typically by 30 µm to 90 µm. Other distances are feasible.

The method may further comprise one or more steps of applying at least one continuous liner to the continuous adhesive strip. As used herein, the term "continuous liner" generally refers to an intermediate cover that is applied to the surface of the continuous adhesive strip in order to form an intermediate product, wherein the continuous liner is removed from the continuous adhesive strip before applying the at least one cover element onto the continuous adhesive strip. Thus, the at least one continuous liner may be or may comprise one or more plastic tapes. However, as outlined above, typically, the process is performed as an in-line-process, typically as a continuous process, without generating one or more intermediate products.

As outlined above, typically, the process is a high-throughput process. Thus, the continuous substrate tape typically is transported in the transport direction at a transport speed of 1 m/min to 150 m/min, typically of 10 m/min to 100 m/min, more typically of 20 m/min to 80 m/min, and, most typically, of about 40 m/min.

The adhesive application step typically, as outlined above, is performed during a continuous transportation of the continuous substrate tape, typically at a constant speed. Thus, typically, both the transport step and the adhesive application step are typically performed continuously and in parallel, such as by using an in-line-process.

Further embodiments of the present disclosure refer to the individualization step. As outlined above, typically, the individualization step may comprise a cutting of the continuous substrate tape, typically with the continuous adhesive strip and the cover element disposed thereon, in a cutting direction perpendicular to the transport direction. Thus, test strips may be generated or intermediate products of the test strips, which may be ready to use or which may be subject to one or more additional manufacturing steps. For the cutting step, known cutting techniques may be used, such as die cutting and/or cutting by using one or more knives or cutter rollers and/or by using one or more laser cutting tools.

In accordance with another embodiment of the present disclosure, a production device for producing a test element for detecting at least one analyte in a body fluid is disclosed. Generally, the production device may be adapted to perform the method according to one or more of the embodiments disclosed above and/or according to one or more of the embodiments disclosed in further detail below. Thus, for potential definitions, optional embodiments or other details of the production device, reference may be made to the respective disclosure of the method. Thus, the production device may comprise one or more devices for performing one or more of the method steps.

The production device comprises at least one of each of the following elements:

I. a tape transport device, the tape transport device being adapted for providing a continuous substrate tape, the tape transport device being adapted to transport the continuous substrate tape in a transport direction parallel to a direction of extension of the continuous substrate tape;

II. an adhesive application device, the adhesive application device being adapted for applying at least one continuous adhesive strip to the continuous substrate tape, by using a liquid adhesive and a slot coating process, the continuous adhesive strip being oriented parallel to the transport direction;

III. a cover element application device, the cover element application device being adapted for applying at least one cover element to the continuous adhesive strip, thereby securing the cover element to the continuous substrate tape; and IV. an individualization device, the individualization device being adapted for individualizing the continuous substrate tape into single test elements.

For potential embodiments of the tape transport device, reference may be made to the disclosure of the method above. Thus, the tape transport device typically may comprise one or more rollers and/or one or more transport wheels. As an example, the at least one tape transport device may comprise one or more reels, such as one or more supply reels, for providing a supply of the continuous substrate tape.

Further, with regard to the adhesive application device, reference may be made to the options disclosed above. Thus, as will be outlined in further detail below, the adhesive application device typically comprises at least one slot coater, typically at least one die slot coater.

The cover element application device generally may comprise one or more arbitrary devices adapted for providing the at least one cover element in a stepwise and/or continuous fashion. Thus, the at least one cover element may be provided in an individualized format, such as by providing one or more dedicated cover elements to each test element. Additionally or alternatively, the at least one cover element may be provided in a continuous process, such as by providing one or more tape-shaped processes. Thus, as an example, as will be outlined in further detail below, one or more supply reels may be provided for applying the at least one cover element to the at least one continuous adhesive strip and/or the continuous substrate tape. As outlined above, one or more pressurizing elements may be provided, for pressing the cover element to the continuous substrate tape and/or the continuous adhesive strip or vice versa.

Further, the individualization device generally may be or may comprise one or more devices adapted for individualizing the continuous substrate tape into single test elements or, which shall also be comprised by this option, into intermediate test elements, which may be subject to one or more additional finalization steps. As outlined above, the individualization device typically may be or may comprise at least one cutting device, such as at least one knife and/or at least one cutting roller and/or at least one blade or laser cutting device. Combinations of these devices are feasible.

The production device may further be adapted to perform a reel process, wherein the at least one continuous substrate tape is supplied by at least one supply reel. Additional elements may be provided. As outlined above, the process typically is performed in an in-line-fashion, such that the test elements are the final product of the in-line-process. However, alternatively, intermediate products may be formed. Thus, the at least one continuous substrate tape with the continuous adhesive strip and the cover element disposed thereon may be stored as an intermediate product, such as by spooling this intermediate product onto an intermediate product reel. The at least one individualization process may be a separate process that is subsequently performed, by using the reel of the intermediate product. However, typically, an in-line-process is used, without using an intermediate product.

The production device may further comprise at least one test chemical application device. The test chemical application device may be adapted to apply the at least one test chemical to at least one of the continuous substrate tape and the cover element. Thus, as an example, the at least one test chemical application device may be embodied by using one or more of the above-mentioned options, such as by using one or more printing techniques and/or one or more of a roller coating and/or a knife coating technique. Additionally or alternatively, other types of deposition techniques may be used, such as one or more of a dispensing technique and/or a printing technique. As an example, reference may be made to International Patent Application No. WO 2004/113917 A2, the disclosure of which is hereby incorporated herein by reference.

As outlined above, the at least one adhesive application device typically may comprise at least one die slot coater. For potential embodiments of the die slot coater, reference may be made to the disclosure of the method as given above. The adhesive application device typically may be adapted to apply at least two continuous adhesive strips to the continuous substrate tape. Thus, as an example, at least two parallel continuous adhesive strips may be applied to the continuous substrate tape. The adhesive application device typically may comprise at least one pressurizing device adapted to apply a pressure of more than 1 bar to the liquid adhesive. Thus, the adhesive application device may comprise a tubing system and at least one pump for supplying the liquid adhesive, such as for supplying the liquid adhesive to at least one nozzle and/or die. The adhesive application device typically may comprise at least one slot die, such as at least one shim, typically a shim providing an opening of a rectangular shape. The slot die typically may have a width perpendicular to the transport direction of less than 5 mm, typically of less than 4 mm and more typically a width of less than 3 mm. Most typically, the slot die has a width of at least 1 mm, such as a width of 1 to 3 mm, typically a width of 2 mm. For further potential embodiments, reference may be made to the disclosure of the method above.

The cover element application device typically may comprise one or more supply reels. As outlined above, the cover element may be applied to the continuous adhesive strip by using a continuous process and/or by using one or more cover elements in an individualized format.

As outlined above, the process may further imply the use of one or more electrodes and, thus, may further imply the application of one or more electrodes. Thus, the production device may further comprise at least one electrode application device, wherein the electrode application device is adapted to apply at least one metal electrode to at least one of the continuous substrate tape and the cover element. For potential application techniques, reference may be made to the deposition techniques listed above. The production device may further comprise at least one patterning device, such as a patterning device that is adapted to pattern the electrodes from a continuous metal layer.

The production device may further comprise at least one surfactant application device, wherein the surfactant application device may be adapted to apply at least one surfactant to a surface of the continuous adhesive strip. For applying the surfactant, reference may be made to known deposition techniques. Thus, as an example, reference may be made to European Patent Application No. EP 2 144 061 A1 and the printing techniques disclosed therein, additionally or alternatively, other types of application devices may be provided, such as one or more printing devices and/or one or more roller coating or knife coating devices and/or one or more dispensing devices.

As outlined above, the tape transport device typically is adapted for high-speed production. Thus, as an example, the tape transport device may be adapted to transport the continuous substrate tape at a transport speed of 1 m/min to 150 m/min, typically of 10 m/min to 100 m/min, more typically of 20 m/min to 80 m/min, and most typically of about 40 m/min. These speeds typically may be generated by known roller techniques and/or reel techniques, such as in a reel-to-reel or a simple reel process, typically an in-line-process.

In accordance with yet another embodiment of the present disclosure, a test element for detecting at least one analyte in a body fluid is disclosed. The test element has at least one substrate and at least one cover element mounted to the substrate via at least one adhesive strip. The test element further has at least one test chemical adapted to perform at least one detection reaction in the presence of the analyte. The test element is producible by the method according to the present disclosure, by using the method in one or more of the embodiments disclosed above or as disclosed in further detail below. Typically, the test element comprises at least one capillary element, such as at least one capillary element for transporting a sample of the body fluid from at least one application position to at least one measurement position, such as to the at least one test chemical. The test element typically is a test strip.

In accordance with still yet another embodiment of the present disclosure, a use of a slot coating process, typically a slot die coating process, for applying at least one adhesive strip to a test element for detecting at least one analyte in a body fluid is disclosed. For optional embodiments of the use and/or the test element, reference may be made to the method and/or the production device as disclosed above or as disclosed in further detail below.

The method, the production device, the test element and the use according to the present disclosure provide a large number of advantages over known methods and devices. Thus, typically, the application of the liquid adhesive or adhesive mass may take place directly in a continuous process, such as in an in-line application. The application of the liquid adhesive may take place in a contactless way, by using the slot coating process, typically the slot die coating process, also referred to as a slot die coating process. Typically, the process may fully or partially be embodied as a reel process, by using one or more supply reels and/or reels for spooling one or more optional intermediate products.

Surprisingly, by using the slot coating process, a high-precision application of the continuous adhesive strip is feasible, even at a very low width of the continuous adhesive strip. Thus, continuous adhesive strips of as low as 1 mm or even less may be manufactured, which is not feasible in other application techniques. Thus, for typical lamination techniques as widely used for applying adhesive laminates, an adhesive strip width of 5 mm or more typically forms a lower limit.

Further, the method and the production device according to the present disclosure provide a high flexibility. Thus, one or more continuous adhesive strips having the same or different width, position or thickness may be applied. Further, a flexibility regarding a drying exists. Thus, one or more optional drying steps may be implemented, wherein the process may also be performed without any drying at all.

Further, as outlined above, the order of the method steps, which may correspond to the order of the various elements and devices within the production device, specifically in a transport direction, is highly flexible. Additional applications may be added and/or one or more applications may be combined into one or more steps. Thus, the application of the adhesive and the production of the at least one continuous adhesive strip may also be combined with an application of the at least one test chemical and/or with other process steps. Thus, a combined application device for applying the liquid adhesive to the continuous substrate tape and for applying the test chemical to the continuous substrate tape, such as a device having a plurality of nozzles or slots, may be used.

Further, as outlined above, the step of generating intermediate products, such as intermediate products having one-sided or two-sided adhesive tapes, may be omitted. Thus, the manufacturing costs may be reduced additionally. Similarly, a step of providing an adhesive tape may be omitted. This step, which typically may be found in lamination processes, typically implies the substeps of: coating a carrier foil, drying the carrier foil with the adhesive, applying a liner to the surface of the adhesive, providing an appropriate cutting process for providing the adhesive tape in an appropriate format. All these process steps may be eliminated, such that the throughput may be increased and the costs of the manufacturing process may be reduced. Still, despite these advantages, the positioning accuracy of the applied continuous adhesive strip, regarding its geometry (position and/or width) is comparable to or even better than the results achieved by using conventional lamination techniques.

Further, as outlined above, as opposed to conventional lamination techniques, the production of continuous adhesive strips by using slot coating is less limited with regard to the width of the continuous adhesive strips. Thus, continuous adhesive strips having a width of as little as 1 mm may be generated. Further, simple test runs may be performed, for generating test tapes having the continuous substrate tape with the continuous adhesive strip disposed thereon, with or without a subsequent drying of the adhesive.

Further, astonishingly, it turned out that the slot coating process is well suited for liquid adhesives of various types. Thus, as opposed to conventional applications of a slot coating process for high-viscous masses, such as in applying surface layers in paper technology and/or for coating reagent pastes, the slot coating process astonishingly also turned out to be highly flexible with regard to non-paste-like coating masses, such as adhesive liquids. Generally, a high flexibility regarding the viscosity of the adhesive liquids turned out to be applicable. Thus, all commercially available adhesive liquids turned out to be applicable, such as liquids having viscosities from 20 mPas to 10,000 mPas.

Further, the surface properties of the continuous adhesive strips turned out to be adjustable to the respective requirements. Thus, as outlined above, hydrophilic surfaces of the continuous adhesive strips turned out to be feasible, either by using adhesive-surfactant-mixtures or adhesives having a surfactant additive, and/or by using an additional step of applying surfactants to a surface of the adhesive test strip. These properties were specifically tested with acrylic liquid adhesives, such as acrylic liquid adhesives provided by Cytec Surface Specialties SA/NV, Brussels, Belgium, specifically of the Ucecryl® type. In a pure format, these acrylic adhesives typically provide hydrophobic surface properties. However, by using surfactant additives and/or by applying one or more surfactants to the surface of the continuous adhesive strips, such as by using printing techniques, the surface properties could be modified, such as in order to perform a hydrophilic surface, all over the area of the continuous adhesive strip and/or over a part of the surface area of the continuous adhesive strip. As an example, Ucecryl® acrylic liquid adhesive is a polymer dispersion based on acrylic acid, having a pH of 3.5 to 5.5, a solid content of 53.5% to 56.5%, and a viscosity of up to 350 mPas. As outlined above, typically, the liquid adhesive typically may comprise one or more liquid adhesives selected from the group consisting of: an Ucecryl® adhesive, as is, e.g., available from Cytec Surface Specialties SA/NV, Brussels, Belgium, such as the Ucecryl® adhesives described in U.S. Patent Application Publication No. 2009/0263652 A1. Additionally or alternatively, one or more of the following liquid adhesives on the basis of an acrylate dispersion may be used: a Helmitin® liquid adhesive, such as Helmitin® 35038; a Swift®tak adhesive, such as Swift®tak 2050; a Technicoll® adhesive, such as Technicoll® 9220 and/or Technicoll® 921; a Dispercoll® adhesive, available from Bayer MaterialScience AG, Leverkusen, Germany, such as Dispercoll® U 56. Other liquid adhesives and/or combinations of the listed liquid adhesives and/or other liquid adhesives are feasible. All adhesives are available from Ruderer Klebetechnik GmbH, Zorneding, Germany.

Thus, summarizing, by using a direct application of the at least one liquid adhesive and by using a slot coating process, the manufacturing turned out to be simplified in various ways and, still, turned out to provide a higher precision as compared to traditional manufacturing techniques.

The test elements provided by the method according to the present disclosure turned out to be easily distinguishable from test elements manufactured by traditional techniques, such as by using lamination techniques and by using one-sided or double-sided adhesive tapes. Thus, generally, by conventional lamination techniques, continuous adhesive tapes having a width of less than 5 mm are hardly producible. Further, due to typical cutting processes used in adhesive laminates, traditional test elements typically provide a frayed or scraggy border. Contrarily, when using the slot coating process, as proposed by the present disclosure, a sharp, well-defined borderline of the continuous adhesive strip was obtained. Further, in laminate setups using a double-sided or one-sided adhesive layer, typically, one or more substrate layers of the adhesive laminate may be detected. Similarly, the complex layer setup of typical laminates, providing one or more adhesive layers and, typically, one or more substrate layers, in many applications tends to a mismatch with the continuous substrate tape, thereby leading to a waviness of the surface or even to a delamination of the setup. Thus, by using the direct slot coating process, as proposed in the present disclosure, an increased stability and a simplified and more stable layer setup may be provided.

In order that the embodiments of the present disclosure may be more readily understood, reference is made to the following examples, which are intended to illustrate the disclosure, but not limit the scope thereof.

In FIG. 1, in a schematic side view, an embodiment of a production device 110 for producing a plurality of test elements 112 is depicted in a side view. The test elements 112 are adapted for detecting at least one analyte in a body fluid and each have at least one test chemical adapted to perform at least one detection reaction in the presence of the analyte. Embodiments of the test element 112 will be disclosed in further detail below.

The production device 110, in this embodiment, is adapted to perform a method according to the present disclosure and, typically, is adapted to perform a continuous in-line application process. The production device 110, for this purpose, provides a supply reel 114 for providing a continuous substrate tape 116. The supply reel 114 is part of a tape transport device 118 that may further comprise additional elements, such as one or more drives 120 and/or one or more rollers 122 and/or transport wheels. The transport device 118 is adapted to transport the continuous substrate tape 116 in a transport direction 124, which may be a continuous and steady transport direction 124 and/or which may comprise one or more turns or changes of the transport direction 124.

The production device 110 further comprises at least one adhesive application device 126 for applying one or more liquid adhesives 128 to the continuous substrate tape 116, thereby generating one or more continuous adhesive strips being oriented parallel to the transport direction 124, which is also a direction 130 of an extension of the continuous substrate tape 116. Thus, typically, the continuous adhesive strip or continuous adhesive strips typically are parallel to lateral edges of the continuous substrate tape 116. Typically, at the location of the adhesive application device 126, the transport direction 124 is a horizontal direction. However, other embodiments are feasible, such as non-vertical directions and/or even an application on the surface of an application wheel.

The production device 110 further comprises at least one cover element application device 132. The cover element application device 132 may be adapted to provide at least one cover element 134, typically a continuous cover element 134, to the at least one continuous adhesive strip, which is not depicted in FIG. 1 and which will be explained in further detail with respect to FIG. 2 below. The cover element application device 132 may provide one or more supply reels 136 and/or one or more optional drives, which are not depicted. Further, additional elements may be provided, such as rollers 122. Typically, the cover element 134 is or comprises a coated or non-coated continuous foil tape.

The production device 110 further comprises at least one individualization device 138. As depicted in FIG. 1, the individualization device 138 may comprise one or more cutting devices, typically for cutting the continuous substrate tape 116, with the at least one continuous adhesive strip and the cover element 134 disposed thereon, in a cutting direction perpendicular to the transport direction 124.

The production device 110 may comprise one or more additional devices. Thus, as depicted in FIG. 1, at least one test chemical application device 140 may be provided, for providing one or more test chemicals 142 to the continuous substrate tape 116, typically in the form of one or more continuous test chemical strips, such as one or more test chemical strips being oriented parallel to the transport direction 124.

The at least one optional test chemical application device 140, which may be adapted to apply the test chemical to the continuous substrate tape 116 and/or to the cover element 134, may be located in various ways. Thus, as depicted in FIG. 1, the test chemical application device 140 may be positioned upstream the at least one adhesive application device 126, with regard to the transport direction 124. Additionally or alternatively, the at least one test chemical application device 140 may be located downstream the at least one adhesive application device 126 and/or may be located at the same position, with regard to the transport direction 124, as the adhesive application device 126.

Further, the production device 110 may optionally comprise one or more surfactant application devices 144. Thus, as an example, the at least one optional surfactant application device 144 may be located downstream the at least one adhesive application device 126 and may be adapted to apply at least one surfactant to a surface of the continuous adhesive strip. Thus, the at least one surfactant application device 144 may comprise one or more print heads and/or nozzles, such as one or more piezo print heads, for applying the surfactant.

Figure 2:
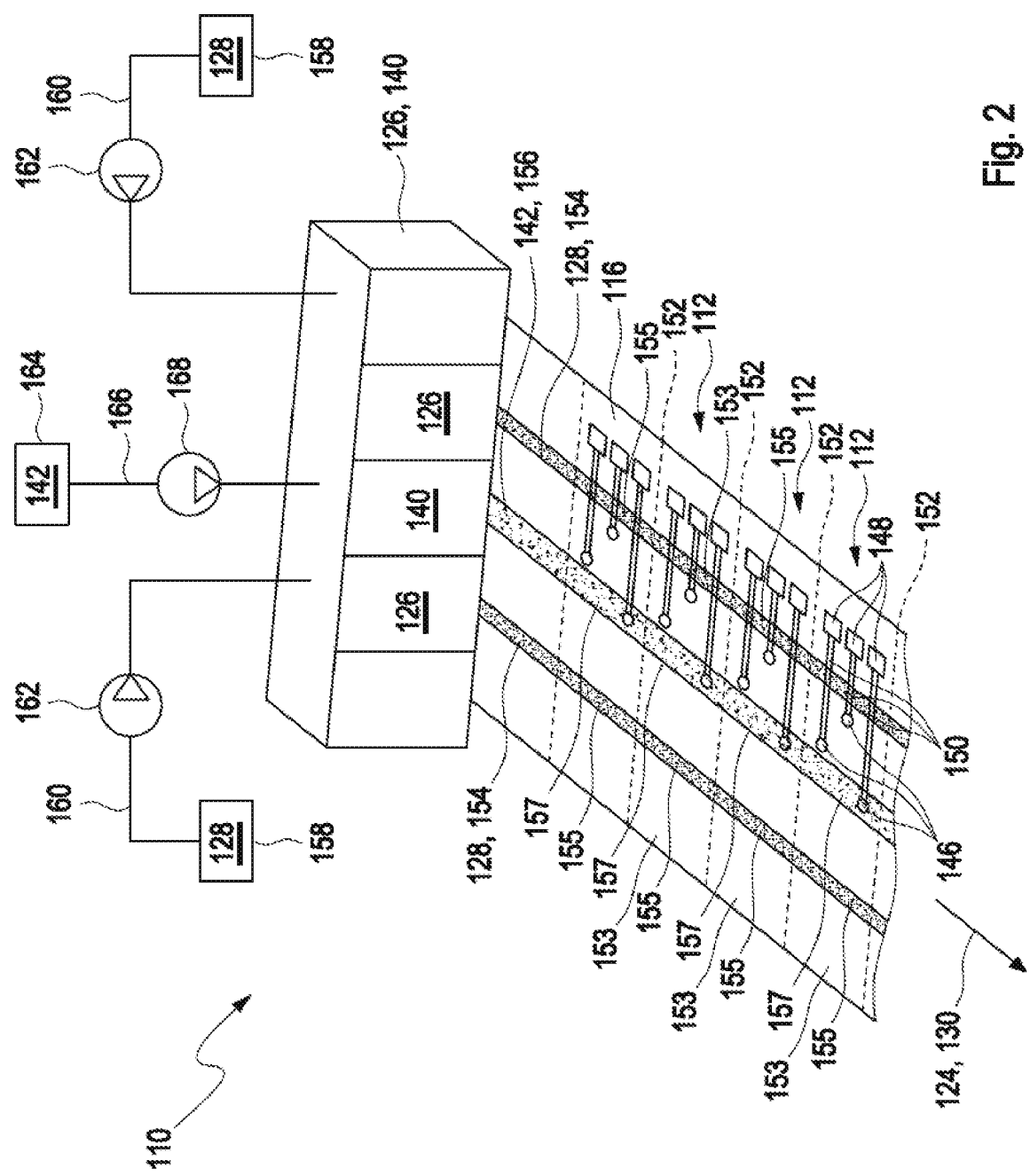
FIG. 2 shows a simplified setup of a potential embodiment of an adhesive application device and a test chemical application device that may be used in the production device of FIG. 1, in a partial perspective view.

In FIG. 2, a partial perspective view of the production device 110 is shown. In this embodiment, a perspective top view onto the continuous substrate tape 116 is shown. As can be seen in this top view, one or more electrodes 146 may be deposited on a surface of the continuous substrate tape 116, each electrode 146 being contacted via at least one contact pad 148 and appropriate leads 150. Further, virtual cutting lines 152 are shown, which indicate a separation between neighboring test elements 112 after the cutting step performed by the individualization device 138. After individualization along the virtual cutting lines 152, the continuous substrate tape 116 is divided into substrates 153. Similarly, the continuous adhesive strip 154 is divided into adhesive strips 155. The continuous test chemical strip 156 may be divided into individual test fields 157.

Further, in FIG. 2, an optional embodiment of the adhesive application device 126 and/or the test chemical application device 140 is shown. Thus, in this specific embodiment, a combined application device is used which provides two adhesive application devices 126 and one test chemical application device 140. The adhesive application devices 126 provide a slot coater, typically a die slot coater, adapted to apply one or more than one continuous adhesive strips 154 to the continuous substrate tape 116. In this specific embodiment, as an example, two parallel continuous adhesive strips 154 are provided, one of them on the left hand side being located outside the electrodes 146, and the other one, on the right hand side, being located in the area of the leads 150. The continuous adhesive strips 154 may have the same width perpendicular to the transport direction 124 and/or may have a different width. Other embodiments, such as other locations of the continuous adhesive strips 154, are feasible.

Further, the combined application device comprises the at least one test chemical application device 140. This test chemical application device 140 may also comprise one or more slot coaters and is adapted for applying at least one test chemical 142 to the continuous substrate tape 116. As an example, in this embodiment or other embodiments of the present disclosure, a continuous test chemical strip 156 may be generated, which, typically, is oriented parallel to the transport direction 124. As an example, the test chemical application device 140 may also be or comprise at least one slot coater, typically a die slot coater. However, additionally or alternatively, other techniques may be used for depositing the at least one test chemical 142, such as non-continuous techniques.

As depicted in the exemplary embodiment of FIG. 2, typically, the at least one test chemical 142 is applied to at least one of the electrodes 146, such as to one working electrode. Typically, one or more of the electrodes 146 remain free of the test chemical 142. Further, typically, the contact pads 148 remain free both of the liquid adhesive 128 and the test chemical 142, in order to provide a sufficient electrical contact.

For providing the liquid adhesive 128 to the adhesive application device 126, one or more tanks 158 may be provided, in conjunction with an appropriate tubing system 160 and/or with at least one pump 162. Similarly, for providing the test chemical 142, typically in a liquid form and/or as a paste, a tank 164 may be provided, in conjunction with a tubing system 166 and/or at least one pump 168.

The production device 110 may comprise one or more additional elements. Thus, as schematically depicted in FIG. 1, the production device 110 optionally may comprise one or more drying devices 170, such as one or more heating plates and/or one or more electromagnetic radiation sources. Further, additionally or alternatively, the production device 110 may comprise one or more pressurizing devices 172, such as one or more pressurizing devices 172 adapted to press the cover element 134 onto the continuous adhesive strip 154 and/or onto the continuous substrate tape 116. Thus, the at least one pressurizing device 172, as depicted in FIG. 1, may comprise one or more nibs or roller gaps between two rollers 122. Other embodiments are feasible.

Figure 3:
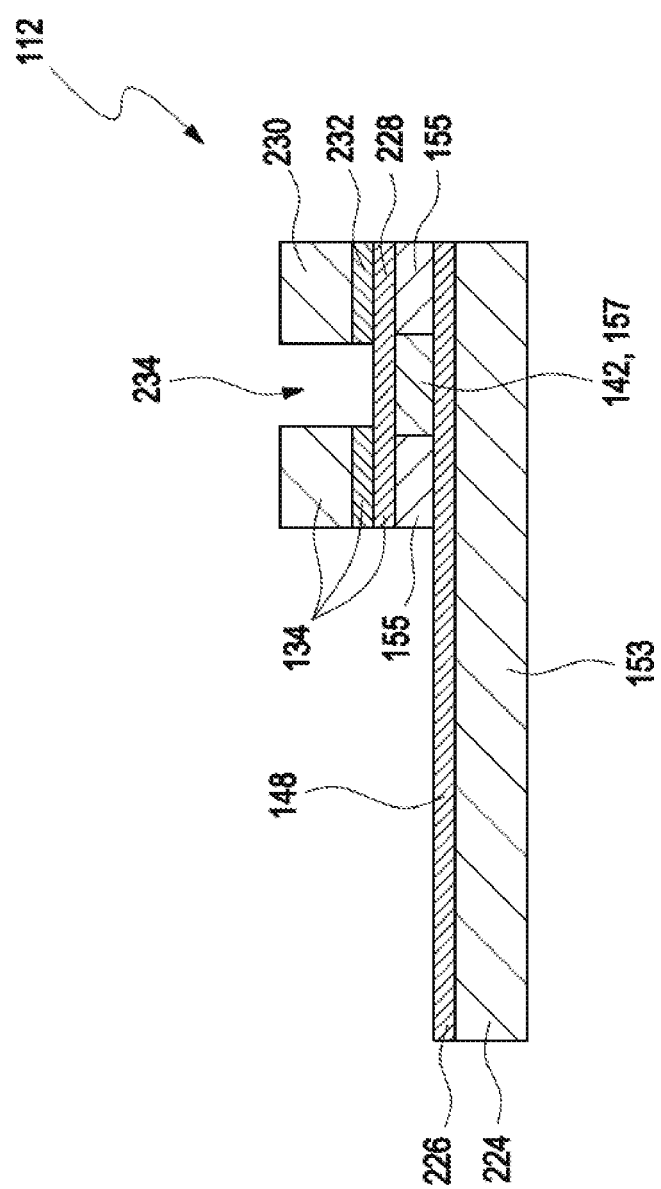
FIG. 3 shows an embodiment of a test element producible by the method according to the present disclosure in a cross-sectional view.

In FIG. 3, an exemplary embodiment of a test element 112 is depicted that is producible by the method according to the present disclosure and/or by using the production device 110 according to the present disclosure. The test element 112 is depicted in a cross-sectional view, such as in a direction of view parallel to the direction of extension 130 of the continuous substrate tape 116 in FIG. 2.

The test element 112 comprises one or more substrates 153, which, as outlined above, may be cut from a continuous substrate tape 116 (see, e.g., FIG. 2 above). To the substrate 153, one or more adhesive strips 155 are applied, which are generated by the adhesive application step, as outlined above. Further, one or more cover elements 134 are applied to the adhesive strips 155, which may be generated by the above-mentioned adhesive application step, followed by the individualization step, in which one or more continuous adhesive strips 154, e.g., as shown in FIG. 2 above, may be cut into the adhesive strips 155. Further, the test element 112 may optionally comprise one or more test fields 157, which each may comprise one or more test chemicals 142 and/or other types of reagents, and which may be generated by a slot coating process and/or by any other suitable process, such as at least one printing process.

The substrate 153 may comprise a plastic foil 224, covered by a conductive layer 226 facing in an upward direction. The at least one conductive layer 226 may be patterned in an arbitrary fashion. The at least one conductive layer 226 provides one or more contact pads 148. On top of the conductive layer 226, a test field 157 having one or more test chemicals 142 is applied. On both sides of the test field 157, adhesive strips 155 are provided, which, in this case, typically have electrically insulating properties.

On top of the adhesive strips 155, one or more cover elements 134 are applied, which, in this embodiment, may comprise a plurality of elements. Thus, on top of the adhesive strips 155, firstly, a membrane 228 is applied, which covers the test field 157 and which is adapted to separate particulate components from the sample of the body fluid, such as in order to separate red blood cells from a sample of whole blood penetrating the membrane 228. On top of the membrane 228, a cover foil 230 may be provided, which, on its side facing the membrane 228, comprises an adhesive layer 232. As an example, an adhesive tape may be used for the cover foil 230.

In accordance with the present embodiment of the disclosure, the cover foil 230 comprises a through-hole 234, which allows for an application of a sample of the body fluid onto the membrane 228. By the membrane 228, particulate components are separated from the sample, whereas the remainder of the sample may penetrate the membrane 228 and reach the test field 157, where a test reaction may take place.

The method and the production device according to the present disclosure generally may be used for manufacturing optical test elements, electrochemical test elements, such as in FIG. 3, or hybrid test elements, i.e., test elements comprising both means for optical measurements and for electrochemical measurements.

It is noted that terms like "preferably", "commonly", and "typically" are not utilized herein to limit the scope of the claimed subject matter or to imply that certain features are critical, essential, or even important to the structure or function of the embodiments disclosed herein. Rather, these terms are merely intended to highlight alternative or additional features that may or may not be utilized in a particular embodiment of the present disclosure.

It is also noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents. Numbered embodiments are presented below.

Numbered Embodiments

In addition or as an alternative to the above, the following embodiments are described:

Embodiment 1

A method for producing a test element for detecting at least one analyte in a body fluid, the test element having at least one test chemical adapted to perform at least one detection reaction in the presence of the analyte, the method comprising the following steps:

a) a transport step, wherein a continuous substrate tape is provided, the continuous substrate tape being transported in a transport direction parallel to a direction of extension of the continuous substrate tape;

b) an adhesive application step, wherein at least one continuous adhesive strip is applied to the continuous substrate tape, by using a liquid adhesive and a slot coating process, the continuous adhesive strip being oriented parallel to the transport direction;

c) a cover element application step, wherein at least one cover element is applied to the continuous adhesive strip, thereby securing the cover element to the continuous substrate tape; and d) an individualization step, wherein the continuous substrate tape is individualized into single test elements.

Embodiment 2

The method according to the preceding embodiment, further comprising the step of applying the test chemical to at least one of the continuous substrate tape and the cover element.

Embodiment 3

The method according to one of the preceding embodiments, wherein the continuous adhesive strip has a width perpendicular to the transport direction of less than 5 mm.

Embodiment 4

The method according to the preceding embodiment, wherein the continuous adhesive strip has a width perpendicular to the transport direction of less than 4 mm.

Embodiment 5

The method according to one of the two preceding embodiments, wherein the continuous adhesive strip has a width perpendicular to the transport direction of less than 3 mm.

Embodiment 6

The method according to one of the preceding embodiments, wherein the continuous adhesive strip has a width perpendicular to the transport direction of at least 1 mm and less than 5 mm.

Embodiment 7

The method according to one of the preceding embodiments, wherein the continuous adhesive strip has a width perpendicular to the transport direction of 0.5 mm to 40.0 mm, typically a width of 1.0 mm to 5 mm, more typically a width of 1.0 mm to 3.0 mm, typically 2.0 mm.

Embodiment 8

The method according to one of the preceding embodiments, wherein at least two continuous adhesive strips are applied to the continuous substrate tape.

Embodiment 9

The method according to one of the preceding embodiments, wherein the slot coating process comprises a slot die coating process.

Embodiment 10

The method according to one of the preceding embodiments, wherein the slot coating process is adapted to apply a pressure of more than 1 bar to the liquid adhesive.

Embodiment 11

The method according to one of the preceding embodiments, wherein the slot coating process is adapted to apply a pressure of 1-2 bar to the liquid adhesive.

Embodiment 12

The method according to one of the preceding embodiments, wherein the liquid adhesive is supplied to a die of a die slot coater via a tubing system and at least one pump.

Embodiment 13

The method according to one of the preceding embodiments, wherein, in the slot coating process, at least one slot die is used having a width perpendicular to the transport direction of less than 5 mm, typically a width of less than 4 mm, and more typically a width of less than 3 mm.

Embodiment 14

The method according to one of the three preceding embodiments, wherein the width is at least 1 mm.

Embodiment 15

The method according to the preceding embodiment, wherein the width is 1-3 mm, typically 2 mm.

Embodiment 16

The method according to one of the preceding embodiments, wherein the continuous substrate tape is a flexible tape.

Embodiment 17

The method according to one of the preceding embodiments, wherein the continuous substrate tape comprises a plastic tape.

Embodiment 18

The method according to one of the preceding embodiments, wherein the continuous substrate tape has a thickness of 10 μm to 1 mm, more typically a thickness of 20 μm to 50 μm, and most typically a thickness of 30 μm.

Embodiment 19

The method according to one of the preceding embodiments, wherein the continuous substrate tape is provided by using at least one supply reel.

Embodiment 20

The method according to one of the preceding embodiments, wherein the cover element comprises at least one functional element.

Embodiment 21

The method according to one of the preceding embodiments, wherein the cover element comprises at least one element selected from the group consisting of: a spreading element; a capillary element; an electrode; a cover foil; a reagent foil comprising the at least one test chemical; a membrane for separating at least two components of the sample of the body fluid.

Embodiment 22

The method according to one of the preceding embodiments, wherein the cover element is a continuous cover element being continuous in the direction of the extension of the substrate tape.

Embodiment 23

The method according to one of the preceding embodiments, wherein the cover element is provided by using at least one supply reel.

Embodiment 24

The method according to one of the preceding embodiments, wherein the at least one test chemical comprises at least one optical test chemical, wherein the optical test chemical is adapted to perform an optical detection reaction in the presence of the analyte, wherein at least one optically detectable property of at least one of the optical test chemical and the body fluid changes due to the optical detection reaction.

Embodiment 25

The method according to one of the preceding embodiments, wherein the at least one test chemical comprises at least one electrochemical test chemical, wherein the electrochemical test chemical is adapted to perform at least one electrochemical detection reaction in the presence of the analyte, wherein at least one electrically detectable property of at least one of the electrochemical test chemical and the body fluid changes due to the electrochemical detection reaction.

Embodiment 26

The method according to the preceding embodiment, wherein the method further comprises the method step of applying at least one electrode to at least one of the continuous substrate tape and the cover element, wherein the electrochemical test chemical is applied to the electrode.

Embodiment 27

The method according to one of the preceding embodiments, wherein at least method steps b) and c) are performed in a continuous process.

Embodiment 28

The method according to the preceding embodiment, wherein no intermediate product is spooled onto a reel.

Embodiment 29

The method according to one of the two preceding embodiments, wherein the continuous process comprises a reel process.

Embodiment 30

The method according to one of the preceding embodiments, wherein the liquid adhesive has a viscosity of 20 mPas to 10,000 mPas.

Embodiment 31

The method according to one of the preceding embodiments, wherein the liquid adhesive has a viscosity of more than 100 mPas.

Embodiment 32

The method according to one of the preceding embodiments, wherein the continuous adhesive strip has a thickness of 2 µm to 150 µm, typically of 10 µm to 100 µm, more typically of 5 µm to 50 µm, and most typically of 10 µm to 20 µm, such as 15 µm.

Embodiment 33

The method according to one of the preceding embodiments, further comprising at least one drying step, wherein the continuous adhesive strip is at least partially dried in the drying step.

Embodiment 34

The method according to the preceding embodiment, wherein the drying step comprises at least one of: a heating of the adhesive strip; an exposure of the adhesive strip to hot gas; an exposure of the adhesive strip to electromagnetic radiation, typically electromagnetic radiation in the ultraviolet spectral range.

Embodiment 35

The method according to one of the two preceding embodiments, wherein the drying step implies a drying by using at least one heating channel and/or at least one heating plate.

Embodiment 36

The method according to one of the preceding embodiments, wherein the cover element is pressed onto the continuous adhesive strip.

Embodiment 37

The method according to one of the preceding embodiments, wherein the liquid adhesive is an acrylic liquid adhesive.

Embodiment 38

The method according to one of the preceding embodiments, wherein the liquid adhesive is a water-based liquid adhesive, typically a water-borne emulsion.

Embodiment 39

The method according to one of the preceding embodiments, wherein the liquid adhesive comprises at least one surface-active additive, typically at least one surfactant and, more typically, at least one hydrophilic surfactant.

Embodiment 40

The method according to one of the preceding embodiments, wherein the method further comprises at least one step of applying at least one surfactant to a surface of the continuous adhesive strip, typically at least one hydrophilic surfactant.

Embodiment 41

The method according to one of the preceding embodiments, wherein the slot coating process implies the use of a die being separated from a surface of the continuous substrate tape by 20 µm to 1.0 mm, typically by 30 µm to 90 µm.

Embodiment 42

The method according to one of the preceding embodiments, further comprising the step of applying at least one continuous liner to the continuous adhesive strip, wherein the continuous liner is removed before applying the at least one cover element to the continuous adhesive strip.

Embodiment 43

The method according to one of the preceding embodiments, wherein the continuous substrate tape is transported in the transport direction at a transport speed of 1 m/min to 150 m/min, typically of 10 m/min to 100 m/min, more typically of 20 m/min to 80 m/min, and most typically of about 40 m/min.

Embodiment 44

The method according to one of the preceding embodiments, wherein the adhesive application step is performed during a continuous transportation of the continuous substrate tape, typically at a constant speed.

Embodiment 45

The method according to one of the preceding embodiments, wherein the individualization step comprises a cutting of the continuous substrate tape in a cutting direction perpendicular to the transport direction.

Embodiment 46

A production device for producing a test element for detecting at least one analyte in a body fluid, the test element having at least one test chemical adapted to perform at least one detection reaction in the presence of the analyte, the production device comprising:
I. a tape transport device, the tape transport device being adapted for providing a continuous substrate tape, the tape transport device being adapted to transport the continuous substrate tape in a transport direction parallel to a direction of extension of the continuous substrate tape;
II. an adhesive application device, the adhesive application device being adapted for applying at least one continuous adhesive strip to the continuous substrate tape, by using a liquid adhesive and a slot coating process, the continuous adhesive strip being oriented parallel to the transport direction;
III. a cover element application device, the cover element application device being adapted for applying at least one cover element to the continuous adhesive strip, thereby securing the cover element to the continuous substrate tape; and
IV. an individualization device, the individualization device being adapted for individualizing the continuous substrate tape into single test elements.

Embodiment 47

The production device according to the preceding embodiment, wherein the production device is adapted to perform the method according to one of the preceding embodiments referring to a method.

Embodiment 48

The production device according to one of the preceding embodiments referring to a production device, wherein the production device is adapted to perform a reel process, wherein at least the continuous substrate tape is supplied by at least one supply reel.

Embodiment 49

The production device according to one of the preceding embodiments referring to a production device, further comprising at least one test chemical application device, wherein the test chemical application device is adapted to apply the at least one test chemical to at least one of the continuous substrate tape and the cover element.

Embodiment 50

The production device according to one of the preceding embodiments referring to a production device, wherein the adhesive application device comprises at least one die slot coater.

Embodiment 51

The production device according to one of the preceding embodiments referring to a production device, wherein the adhesive application device is adapted to apply at least two continuous adhesive strips to the continuous substrate tape.

Embodiment 52

The production device according to one of the preceding embodiments referring to a production device, wherein the adhesive application device comprises at least one pressurizing device adapted to apply a pressure of more than 1 bar to the liquid adhesive.

Embodiment 53

The production device according to one of the preceding embodiments referring to a production device, wherein the adhesive application device comprises a tubing system and at least one pump for supplying the liquid adhesive.

Embodiment 54

The production device according to one of the preceding embodiments referring to a production device, wherein the adhesive application device comprises at least one slot die.

Embodiment 55

The production device according to the preceding embodiment, wherein the slot die has a width perpendicular to the transport direction of less than 5 mm, typically of less than 4 mm, and more typically a width of less than 3 mm.

Embodiment 56

The production device according to one of the two preceding embodiments, wherein the slot die has a width of at least 1 mm.

Embodiment 57

The production device according to one of the three preceding embodiments, wherein the slot die has a width of 1-3 mm, typically 2 mm.

Embodiment 58

The production device according to one of the preceding embodiments referring to a production device, wherein the cover element application device comprises at least one supply reel.

Embodiment 59

The production device according to one of the preceding embodiments referring to a production device, further comprising at least one electrode application device, wherein the electrode application device is adapted to apply at least one metal electrode or electrode material to at least one of the continuous substrate tape and the cover element.

Embodiment 60

The production device according to one of the preceding embodiments referring to a production device, wherein the production device further comprises at least one surfactant application device, wherein the surfactant application device is adapted to apply at least one surfactant to a surface of the continuous adhesive strip.

Embodiment 61

The production device according to one of the preceding embodiments referring to a production device, wherein the tape transport device is adapted to transport the continuous substrate tape at a transport speed of 1 m/min to 150 m/min, typically of 10 m/min to 100 m/min, more typically of 20 m/min to 80 m/min, and most typically of about 40 m/min.

Embodiment 62

A test element for detecting at least one analyte in a body fluid, the test element having at least one substrate and at least one cover element mounted to the substrate via at least one adhesive strip, the test element further having at least one test chemical adapted to perform at least one detection reaction in the presence of the analyte, wherein the test element is producible by the method according to one of the preceding embodiments referring to a method.

Embodiment 63

The test element according to the preceding embodiment, wherein the test element further comprises at least one capillary element.

Embodiment 64

The test element according to one of the two preceding embodiments, wherein the test element is a test strip.

Embodiment 65

A use of a slot coating process, typically a slot die coating process, for applying at least one adhesive strip to a test element for detecting at least one analyte in a body fluid.

| List of reference numbers | |
| --- | --- |
| 110 | production device |
| 112 | test element |
| 114 | supply reel |
| 116 | continuous substrate tape |
| 118 | tape transport device |
| 120 | drive |
| 122 | roller |
| 124 | transport direction |
| 126 | adhesive application device |
| 128 | liquid adhesive |
| 130 | direction of extension |
| 132 | cover element application device |
| 134 | cover element |
| 136 | supply reel |
| 138 | individualization device |
| 140 | test chemical application device |
| 142 | test chemical |
| 144 | surfactant application device |
| 146 | electrode |
| 148 | contact pad |
| 150 | lead |
| 152 | virtual cutting line |
| 153 | substrate |
| 154 | continuous adhesive strip |
| 155 | adhesive strip |
| 156 | continuous test chemical strip |
| 157 | test field |
| 158 | tank |
| 160 | tubing system |
| 162 | pump |
| 164 | tank |
| 166 | tubing system |
| 168 | pump |
| 170 | drying device |
| 172 | pressurizing device |
| 224 | plastic foil |
| 226 | conductive layer |
| 228 | membrane |
| 230 | cover foil |
| 232 | adhesive layer |
| 234 | through-hole |

What is claimed is:

1. A method for producing a test element for detecting at least one analyte in a body fluid, the test element having at least one test chemical configured to perform at least one detection reaction in the presence of the analyte, the method comprising the following steps:
   a) providing, in a transport step, a continuous substrate tape, wherein the continuous substrate tape is transported in a transport direction parallel to a direction of extension of the continuous substrate tape;
   b) applying, in an adhesive application step, at least one continuous adhesive strip to the continuous substrate tape by using a liquid adhesive and a slot coating process, the continuous adhesive strip being oriented parallel to the transport direction, wherein the liquid adhesive is provided in a liquid form, wherein the liquid adhesive comprises one or more solvents, and wherein the liquid adhesive is a water-based liquid adhesive;

c) partially drying, in an at least one drying step, the continuous adhesive strip by removing one or more solvents from the liquid adhesive such that a stickiness or adhesive properties remain after the partial drying, and wherein the liquid adhesive is not fully dried during the at least one drying step;

d) applying, in a cover element application step, at least one cover element to the continuous adhesive strip, thereby securing the cover element to the continuous substrate tape, wherein the cover element application step is performed after the at least one drying step, and the cover element is applied to the partially dried adhesive strip; and e) individualizing, in an individualization step, the continuous substrate tape into single test elements.

2. The method according to claim 1, further comprising at least one step of applying at least one surfactant to a surface of the continuous adhesive strip.

3. The method according to claim 2, wherein the surfactant is a hydrophilic surfactant.

4. The method according to claim 1, wherein the drying step further comprises at least one of exposing heating the adhesive strip and/or exposing the adhesive strip to hot gas.

5. The method according to claim 1, wherein the liquid adhesive is an acrylic liquid adhesive.

6. The method according to claim 1, wherein the water-based liquid adhesive is a water-borne emulsion.

7. The method according to claim 1, further comprising the step of applying the test chemical to at least one of the continuous substrate tape and the cover element.

8. The method according to claim 1, wherein the continuous adhesive strip has a width perpendicular to the transport direction of less than 5 mm.

9. The method according to claim 1, wherein at least two continuous adhesive strips are applied to the continuous substrate tape.

10. The method according to claim 1, wherein the continuous substrate tape is a flexible tape.

11. The method according to claim 1, wherein the continuous substrate tape comprises a plastic tape.

12. The method according to claim 1, wherein the cover element is a continuous cover element being continuous in the direction of the extension of the substrate tape.

13. The method according to claim 1, wherein the liquid adhesive has a viscosity of 20 mPas to 10,000 mPas.

14. The method according to claim 1, wherein the cover element is pressed onto the continuous adhesive strip.

15. The method according to claim 1, further comprising the step of applying at least one continuous liner to the continuous adhesive strip, wherein the continuous liner is removed before applying the at least one cover element to the continuous adhesive strip.

16. The method according to claim 1, wherein the liquid form comprises at least one form selected from the group consisting of: a solution; an emulsion; and a dispersion.

* * * * *